June 28, 1932. J. K. JENSEN 1,865,319
BREATHER PIPE CAP
Filed Sept. 2, 1930
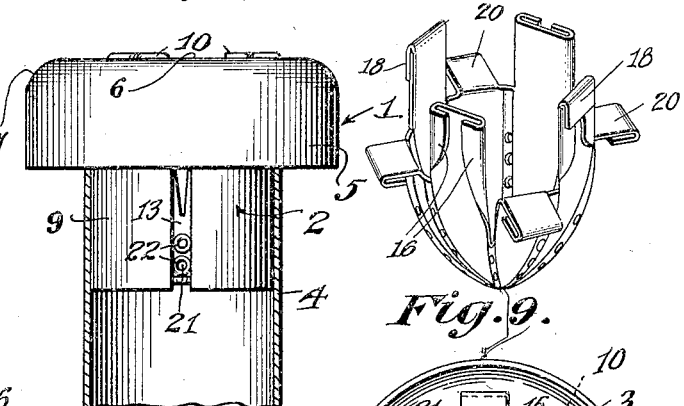
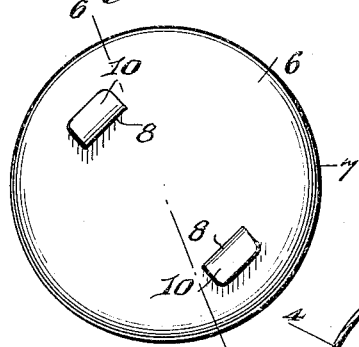
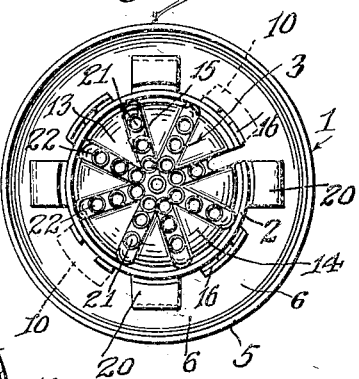
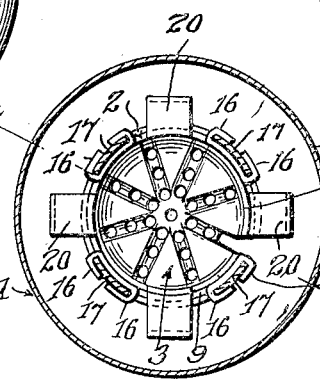
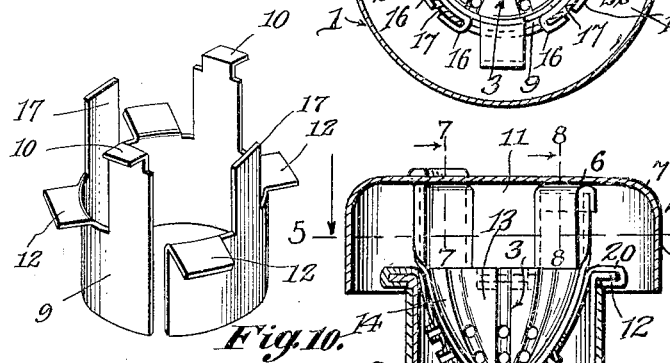
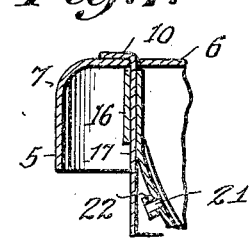
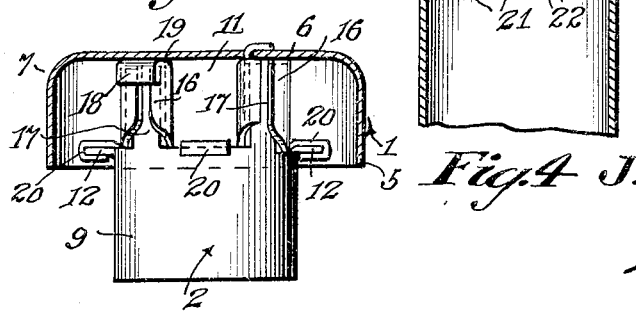
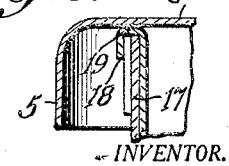
INVENTOR
J. K. Jensen,
BY Geo. P. Kimmel.
ATTORNEY Patented June 28, 1932

1,865,319

UNITED STATES PATENT OFFICE

JOHN K. JENSEN, OF BLACKFOOT, IDAHO

BREATHER PIPE CAP

Application filed September 2, 1930. Serial No. 479,356.

This invention relates to a cap for breather pipes of crank cases of automotive vehicles, and has for its object to provide in a manner as hereinafter set forth, a cap so constructed and arranged to prevent the escape of oil from the crank case through the breather pipe of a vehicle thereby resulting in the motor running clean.

A further object of the invention is to provide, in a manner as hereinafter set forth, a breather pipe cap so constructed and arranged to prevent the escape of oil from the crank case, and at the same time not impairing in any manner the function of the breather pipe.

Further objects of the invention are to provide, in a manner as hereinafter set forth, a breather pipe cap which is simple in its construction and arrangement, strong, durable, compact, readily installed with respect to the breather pipe, thoroughly efficient in its use, and comparatively inexpensive to manufacture.

With the foregoing and other objects in view, the invention consists of the novel construction, combination and arrangement of parts, as hereinafter more specifically described and illustrated in the accompanying drawing, wherein is shown an embodiment of the invention but it is to be understood that changes, variations and modifications can be resorted to which fall within the scope of the claims hereunto appended.

In the drawing wherein like reference characters denote corresponding parts throughout the several views:

Figure 1 is a side elevation of a breather cap in accordance with this invention showing the adaptation thereof with respect to the breather pipe, the latter being illustrated in vertical section.

Figure 2 is a top plan view of a breather cap in accordance with this invention.

Figure 3 is an inverted plan view of a breather cap in accordance with this invention.

Figure 4 is a section on line 4—4 Figure 5.
Figure 5 is a section on line 5—5 Figure 4.
Figure 6 is a section on line 6—6 Figure 2.
Figure 7 is a section on line 7—7, Figure 4.
Figure 8 is a section on line 8—8, Figure 4.
Figure 9 is a perspective view of the guard member.

Figure 10 is a perspective view of the coupling member.

A breather pipe cap, in accordance with this invention includes an annular, inverted cup-shaped head member, a split, notched annular, resilient coupling member and a hollow, inverted, apertured, conoidal shaped guard member referred to generally at 1, 2 and 3 respectively. The member 1 is of materially greater diameter than the breather pipe 4. The member 2 is of a diameter less than the inner diameter of the breather pipe 4 and is adapted to snugly engage the inner face of the latter.

The member 1 includes a vertically disposed annular body part 5 and a horizontally disposed circular top part 6. The upper portion of the part 5 is rounded, as at 7 and which merges into the part 6. Formed in the top part 6 is a pair of diagonally disposed diametrically opposed slots 8 arranged in spaced relation. The purpose of the slots 8 will be presently referred to.

The member 2 includes a vertically disposed split sleeve 9 and with the split in the sleeve extending from its top to its bottom edge. The top edge of sleeve 9 abuts against the inner face of part 6. Projecting from the top edge of sleeve 9 is a pair of diametrically disposed bendable lugs 10 which extend through the slots 8 and are bent against the outer face of part 6 whereby the members 1 and 2 are connected together. The upper portion of sleeve 9 is provided with notches or cutouts at spaced points to form combined outlets and inlets 11 of rectangular contour. At the base of each combined outlet and inlet 11 the sleeve 9 is formed with an outwardly extending right angularly disposed tongue 12. The split in sleeve 9 provides for the resiliency of the coupling member 12 and when mounted within the pipe 4 the outer face of sleeve 9 frictionally engages with the inner face of pipe 4 whereby member 9 and pipe 4 are frictionally connected together.

The member 3 not only constitutes a guard to prevent the escape of oil through the pipe 4, but also acts as a means for suspending coupling member 2 and the latter has its tongues 12 coact with means forming part of the member 3 for the purpose of connecting number 3 with number 1. The member 3 includes an inverted, hollow conoidal shaped body part 13 formed with outset portions extending from the bottom to the top of said part 13 thereby forming grooves 14 on the inner face of part 13 and ribs 15 on the outer face of part 13. Formed integral with the top of body portion 13 is a plurality of spaced, upstanding bendable extensions 16 which are bent to overlap the parts 17 of sleeve 9. The parts 17 being arranged between the combined outlets and inlets at the upper portion of sleeve 9. The extensions 16 are of a length to permit the upper portions 18 thereof to be bent downwardly and abut both portions of the extensions 16 which are disposed lengthwise with respect to the parts 17 of the sleeve 9. The bend 19 at the top of each extension 16 abuts the inner face of the part 6 of member 1. The part 13 of member 2 is furthermore provided with laterally disposed bendable tongues 20 which overlap the tongues 12 of the sleeve 9 whereby sleeve 9 and part 13 are connected together. When the cap is set up the lower portion of the tongues 20 seat on the top edge of the pipe 4 acting as a suspension means for the member 2. Each outset part or portion of the part 13 and which provides a groove on the inner face of the part 13 and a rib on the outer face of the latter is formed with a series of superposed spaced openings 21 communicating with nipples 22 which are an integral portion of part 13.

The member 3 is of a length, that when mounted in position will extend to a point in close proximity to the lower end of sleeve 9. The openings 21 and nipples 22 coact to provide member 3 with combined outlets and inlets. The member 3 functions to prevent the escape of oil through pipe 4, and if any oil should pass through nipples 22 and openings 21 it will drain back into the crank case. The combined outlets and inlets in member 2 and in member 3 permit of escape of air or intake of air when desired, as well as for the passage of vapors from the crank case. The top part 6 of member 1 is of greater diameter than sleeve 9 and acts as an arrestor of oil if it should pass to the upper end of sleeve 9.

The member 3 can be provided with any desirable number of grooves and the width and depth of each groove, as well as the number of the openings of the series of openings in the base of a groove can be as desired. The device not only functions to prevent the escape of oil, but also acts as a means to arrest foreign substances passing through the breather pipe into the engine.

Although the preferred embodiment of the invention is as illustrated and described, yet it is to be understood that changes in the details thereof can be had which fall within the scope of the invention as claimed.

What I claim is:

1. A breather pipe cap comprising an inverted cup shaped head member, a tubular resilient coupling member of less diameter than the head member and for extension into and for connection to the breather pipe, said head member and coupling member having spaced coacting means for connecting the former to the latter and for maintaining the head member spaced from and in encompassing spaced relation to said coupling member, said coupling member having laterally disposed spaced means for seating on the top edge of the breather pipe, an inverted, hollow conoidal shaped guard member extending into said coupling member and formed with a plurality of spaced rows of spaced openings to provide combined inlets and outlets surrounded by a portion of the coupling member, and said guard member having lateral means coacting with the lateral means of the coupling member for connecting the guard and coupling member together.

2. A breather pipe cap comprising an inverted cup shaped head member, a tubular resilient coupling member of less diameter than the head member and for extension into and for frictional connection to the breather pipe, a plurality of spaced extensions at the upper end of the coupling member for connection to the top of the head member for coupling said members together and for maintaining the head member spaced from and in encompassing relation with respect to the top of the coupling member, the said extensions in connection with said head member providing combined inlets and outlets, spaced laterally disposed means at the top of said coupling member for seating on the top edge of the breather pipe, an inverted, hollow, open top, conoidal shaped guard member extending into said coupling member and formed with openings providing combined inlets and outlets surrounded by a portion of said coupling member, and said guard member having means coacting with said extensions and means of the coupling member for connecting it to the latter.

3. A breather pipe cap comprising an inverted cup shaped head member, a tubular resilient coupling member for connection to the breather pipe, upstanding spaced means at the top of the coupling member for connecting the head member to the latter and providing combined inlets and outlets, laterally disposed means at the top of the coupling member for seating on the top edge of the breather pipe, an inverted, hollow, open top, conoidal shaped guard member extending into the coupling member, spaced from the head member and formed with spaced grooves having the walls thereof apertured providing combined inlets and outlets, and said guard member having means coacting with said upstanding and lateral means for connecting it to said coupling member.

4. A breather pipe cap comprising an inverted cup shaped head member, a tubular resilient coupling member for connection to the breather pipe, upstanding spaced means at the top of the coupling member for connecting the head member to the latter and providing combined inlets and outlets, laterally disposed means at the top of the coupling member for seating on the top edge of the breather pipe, an inverted, hollow, open top, conoidal shaped guard member extending into the coupling member, spaced from the head member and formed with spaced grooves having the walls thereof apertured providing combined inlets and outlets, and said guard member having means coacting with said lateral means for connecting it to the coupling member.

5. A breather pipe cap comprising an inverted cup shaped head member, a tubular resilient coupling member for connection to the breather pipe, upstanding spaced extensions at the top of said coupling member, certain of said extensions having their upper ends secured to the head member for coupling said members together, said extensions providing combined inlets and outlets, spaced lateral extensions at the top of the coupling member for seating on the top edge of the breather pipe, a hollow, open top and closed bottom guard member extending into said coupling member and formed with spaced openings providing combined inlets and outlets surrounded in spaced relation by a portion of the coupling member, and said guard member having means secured to said upstanding extensions for securing it to the coupling member.

6. A breather pipe cap comprising an inverted cup shaped head member, a tubular resilient coupling member for connection to the breather pipe, upstanding spaced extensions at the top of said coupling member, a certain of said extensions having their upper ends secured to the head member for coupling said members together, said extensions providing combined inlets and outlets, spaced lateral extensions at the top of the coupling member for seating on the top edge of the breather pipe, a hollow, open top and closed bottom guard member extending into said coupling member and formed with spaced openings providing combined inlets and outlets surrounded in spaced relation by a portion of the coupling member, and said guard member having means secured to said upstanding and lateral extensions for securing it to the coupling member.

In testimony whereof, I affix my signature hereto.

JOHN K. JENSEN.